(12) United States Patent
Tan et al.

(10) Patent No.: US 8,421,634 B2
(45) Date of Patent: Apr. 16, 2013

(54) SENSING MECHANICAL ENERGY TO APPROPRIATE THE BODY FOR DATA INPUT

(75) Inventors: Desney S. Tan, Kirkland, WA (US); Dan Morris, Bellevue, WA (US); Christopher Harrison, Mount Kisco, NY (US)

(73) Assignee: Microsoft Corporation, Redmond, WA (US)

( * ) Notice: Subject to any disclaimer, the term of this patent is extended or adjusted under 35 U.S.C. 154(b) by 606 days.

(21) Appl. No.: 12/630,892

(22) Filed: Dec. 4, 2009

(65) Prior Publication Data

US 2011/0133934 A1    Jun. 9, 2011

(51) Int. Cl.
G08B 23/00    (2006.01)
(52) U.S. Cl.
USPC .................................. 340/573.1; 340/573.7
(58) Field of Classification Search ............... 340/573.1
See application file for complete search history.

(56) References Cited

U.S. PATENT DOCUMENTS

| | | | |
|---|---|---|---|
| 6,380,923 B1 | 4/2002 | Fukumoto et al. | |
| 6,748,281 B2 | 6/2004 | Alsio | |
| 7,042,438 B2 * | 5/2006 | McRae et al. | 345/156 |
| 7,148,879 B2 * | 12/2006 | Amento et al. | 345/158 |
| 7,362,305 B2 * | 4/2008 | Alsio et al. | 345/156 |
| 2008/0055248 A1 * | 3/2008 | Tremblay et al. | 345/158 |
| 2008/0136775 A1 * | 6/2008 | Conant | 345/156 |
| 2009/0096746 A1 * | 4/2009 | Kruse et al. | 345/156 |
| 2009/0251407 A1 * | 10/2009 | Flake et al. | 345/156 |

FOREIGN PATENT DOCUMENTS

| | | |
|---|---|---|
| JP | 2007-128304 | 5/2007 |
| JP | 2007-128304 A | 5/2007 |
| JP | 2007128304 A * | 5/2007 |

OTHER PUBLICATIONS

Jun Rekimoto, "GestureWrist and GesturePad: UnobtrusiveWearable Interaction Devices", Retrieved at<<http://www.sonycsl.co.jp/person/rekimoto/papers/iswc01.pdf>>, Proceedings of the 5th IEEE International Symposium on Wearable Computers, Aug. 21, 2007., pp. 7.

Fukumoto, et al., ""FingeRing": A Full-Time Wearable Interface", Retrieved at <<http://delivery.acm.org/10.1145/270000/260056/p81-fukumoto.pdf?key1=260056&key2=7509006521&coll=GUIDE&dl=GUIDE&CFID=58514611&CFTOKEN=25691004>>, Conference companion on Human factors in computing systems, Boston, Apr. 24-28, 1994, ACM, pp. 81-82.

Fukumoto, et al., "Fulltime-wear Interface Technology", Retrieved at<<https://www.ntt-review.jp/archive/ntttechnical.php?contents=ntr200311077.pdf>>, Nov. 2003, vol. 1 No. 8, pp. 77-81.

(Continued)

*Primary Examiner* — Travis Hunnings
(74) *Attorney, Agent, or Firm* — Gonzalez Saggio & Harlan LLP (57) ABSTRACT

Described is using the human body as an input mechanism to a computing device. A sensor set is coupled to part of a human body. The sensor set detects mechanical (e.g., bio-acoustic) energy transmitted through the body as a result of an action/performed by the body, such as a user finger tap or flick. The sensor output data (e.g., signals) are processed to determine what action was taken. For example, the gesture may be a finger tap, and the output data may indicate which finger was tapped, what surface the finger was tapped on, or where on the body the finger was tapped.

20 Claims, 8 Drawing Sheets

OTHER PUBLICATIONS

Amento, et al., "The Sound of One Hand: A Wrist-Mounted Bio-Acoustic Fingertip Gesture Interface", Retrieved at<<http://www.chi2003.org/docs/onehand.pdf>>, Apr. 20-25, 2002, ACM, pp. 724-725.

Argyros, et al., "Vision-based Interpretation of Hand Gestures for Remote Control of a Computer Mouse", Retrieved at<<http://www.ics.forth.gr/~argyros/mypapers/2006_05_hci_virtualmouse.pdf>>, HCI/ECCV 2006, pp. 40-51.

Christopher J.C. Burges, "A Tutorial on Support Vector Machines for Pattern Recognition", Retrieved at<<http://www.umiacs.umd.edu/~joseph/support-vector-machines4.pdf>>, Data Mining and Knowledge Discovery, 2, 1998, pp. 121-167.

Erol, et al.,"Vision-Based Hand Pose Estimation: A Review", Retrieved at<<http://www.cse.unr.edu/~bebis/handposerev.pdf>>, Jan. 19, 2007, pp. 52-73.

Fabiani, et al., "Conversion of EEG Activity into Cursor Movement by a Brain-Computer Interface (BCI)", Retrieved at<<http://ieeexplore.ieee.org/xpls/abs_all.jsp?arnumber=1333048>>, IEEE Transactions on Neural Systems and Rehabilitation Engineering, vol. 12, No. 3, Sep. 2004, pp. 331-338.

Grimes, et al., "Feasibility and Pragmatics of Classifying Working Memory Load with an Electroencephalograph", Retrieved at<<http://delivery.acm.org/10.1145/1360000/1357187/p835-grimes.pdf?key1=1357187&key2=6438906521&coll=GUIDE&dl=GUIDE&CFID=57505897&CFTOKEN=58740240>>, CHI 2008 Proceedings • Cognition, Perception, and Memory, Apr. 5-10, 2008, pp. 835-844.

Harrison, et al., "Scratch Input: Creating Large, Inexpensive, Unpowered and Mobile finger Input Surfaces", Retrieved at <<http://www.chrisharrison.net/projects/scratchinput/ScratchInputHarrison.pdf>>, Oct. 19-22, 2008, pp. 4.

Ishii, et al., "Design of an Athletic-Tangible Interface for Computer-Supported Cooperative Play", Retrieved at<<http://tangible.media.mit.edu/content/papers/pdf/PingPongPlus_CHI99.pdf>>, Published in the Proceedings of CHI '99, May 15-20, 1999, ACM, pp. 1-8.

Lee, et al., "Using a Low-Cost Electroencephalograph for Task Classification in HCI Research", Retrieved at<<http://delivery.acm.org/10.1145/1170000/1166268/p81-Iee.pdf?key1=1166268&key2=7098906521&coll=ACM&dl=ACM&CFID=57506442&CFTOKEN=77904856>>, Oct. 15-18, 2006, pp. 81-90.

Mandryk, et al., "A Fuzzy Physiological Approach for Continuously Modeling Emotion during Interaction with Play Environments", Retrieved at<<ftp://ftp.fas.sfu.ca/pub/cs/TR/2006/CMPT2006-06.pdf>>, International Journal of Human-Computer Studies, vol. 65, Issue 4 (Apr. 2007), pp. 1-13.

Mandryk, et al., "Using Psychophysiological Techniques to Measure User Experience with Entertainment Technologies", Retrieved at<<http://www.reganmandryk.com/pubs/mandryk_bit_preprint.pdf>>, Journal of Behaviour and Information Technology, vol. 25, Issue 2 Mar. 2006, pp. 1-16.

McFarland, et al., "Brain—Computer Interface (BCI) Operation: Optimizing Information Transfer Rates", Retrieved at<<http://www.cis.gsu.edu/brainlab/papers/mcFetal-03-optimizing-info-transfer.pdf>>, Available online May 23, 2003, pp. 237-251.

Mistry, et al., "WUW—Wear Ur World: A Wearable Gestural Interface", Retrieved at<<http://fluid.media.mit.edu/assets/_pubs/wip177-mistry.pdf>>, CHI, Apr. 4-9, 2009, pp. 6.

Post, et al., "Smart Fabric, or Wearable Clothing", Retrieved at<<http://ieeexplore.ieee.org/xpl/freeabs_all.jsp?arnumber=629937>>, IEEE, Oct. 13-14, 1997, pp. 167-168.

Robert Rosenberg, "The Biofeedback Pointer: EMG Control of a Two Dimensional Pointer", Retrieved at<<http://ieeexplore.ieee.org/xpl/freeabs_all.jsp?arnumber=729546>>, This paper appears in: Wearable Computers, 1998. Digest of Papers. Second International Symposium on, Oct. 19-20, 1998, pp. 2.

Saponas, et al., "Demonstrating the Feasibility of Using Forearm Electromyography for Muscle-Computer Interfaces", Retrieved at <<http://dub.washington.edu/djangosite/media/papers/tmpLeBrvO.pdf>>, CHI 2008, Apr. 5-10, 2008, ACM, pp. 10.

Sturman, et al., "A Survey of Glove-based Input", Retrieved at<<http://design.osu.edu/carlson/history/PDFs/gloves.pdf>>, IEEE, Jan. 1994, vol. 14, Issue 1, pp. 30-39.

Wilson, et al., "Play Anywhere: A Compact Interactive Tabletop Projection-Vision System", Retrieved at<<http://209.85.229.132/search?q=cache:Q5qJekt3jQsJ:research.microsoft.com/~awilson/papers/Wilson%2520PlayAnywhere%2520UIST%25202005.pdf+PlayAnywhere:+a+compact+interactive+tabletop+projection-vision+system&cd=1&hl=en&ct=clnk&gl=in>>, Oct. 23-27, 2005, ACM, pp. 1-14.

Deyle, et al., "Hambone: A Bio-Acoustic Gesture Interface", Retrieved at<<http://ieeexplore.ieee.org/stamp/stamp.jsp?tp=&isnumber=&arnumber=4373768>>, IEEE, Oct. 11-13, 2007, pp. 8.

Paradiso, et al., "Passive Acoustic Knock Tracking for Interactive Windows", Retrieved at <<http://www.media.mit.edu/resenv/pubs/papers/2002-04-tapper-chi-short.pdf>>, ACM CHI 2002 Conference, Apr. 20-25, 2002, pp. 2.

"International Search Report", Mailed Dec. 28, 2011, Application No. PCT/US2010/055735 Filed Date Nov. 5, 2010, pp. 1-7.

Ahmad, et al., "A Keystroke and Pointer Control Input Interface for Wearable Computers," Proceedings of the Fourth Annual IEEE International Conference on Pervasive Computing and Communications (PERCOM'06), Pages 10. Published Date: Mar. 13, 2006.

Lakshmipathy, et al., "Talkbalk: A Conversational Answering Machine," Proceedings of the 16th Annual ACM symposium on User Interface Software and Technology. Pages 8. Published Date: Nov. 2, 2003.

Witten, et al., "Data Mining: Practical Machine Learning Tools and Techniques," Pages 2. Published Jun. 8, 2005.

\* cited by examiner

SENSING MECHANICAL ENERGY TO APPROPRIATE THE BODY FOR DATA INPUT

BACKGROUND

Today, many computing devices have significant computational power and capabilities, yet are small enough and light enough that they can be easily carried. However, having such small sizes typically means that these devices have correspondingly small and limited interaction mechanisms, such as in the form of diminutive screens, buttons, and/or jog wheels. This diminishes the usability and functionality of such devices, because simply making buttons and screens larger results in losing the benefit of small device size.

One option is to opportunistically appropriate a surface area for interactive purposes. For example, one technique allows a small mobile device to use a table on which it rests as a gestural finger input canvas. However, a table is not always available for use, and in a mobile context, it is highly unlikely that users will be willing to carry such a surface with them; (indeed, at this point a user would probably prefer to simply have a larger device).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which the human body is used as an input mechanism to a computing device. A sensor set is coupled to part of a human body, such as by wearing an armband that contains arrays of sensors. The sensor set detects mechanical energy resulting from an action (a gesture) performed by the body, and provides output data (e.g., signals) corresponding to the action. The signals may be processed into other information corresponding to the output data, e.g., a particular gesture from among possible gestures.

A computing device uses the information corresponding to the output data, such as the type of gesture that was performed, or location information as to where the body was tapped, as data input. For example, the gesture may be a finger tap, and the output data may indicate which finger was tapped, what surface the finger was tapped on, or where on the body the finger was tapped, and so forth.

In one implementation, the sensor set detects transverse waves and longitudinal waves at a plurality of frequencies, with each sensor associated with a resonant frequency. The sensor set may output signals to a data capture (e.g., sampling) mechanism. The signals may be processed in various ways, e.g., into segments, with each segment evaluated to determine whether it corresponds to a user-intended gesture. If a gesture, the segment (e.g., a waveform) may have its features extracted. The extracted features may then be used by a classifier to determine what the action/gesture was, e.g., a finger tap, where the finger was tapped, and so on.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards appropriating part of the human body as an interactive data input device. In one implementation, the body may be sensed with respect to finger input using a non-invasive, wearable bio-acoustic sensor set for bio-acoustic signal acquisition. In general, the sensor set can detect mechanical energy transmitted through the body. Also provided is an analysis approach that enables a system to resolve the action, e.g., a location on the body where a finger tap occurred. Note that using one's body as an input device is desirable because it is always present, and because a human body has approximately two square meters of external surface area. Further, proprioception, which refers to a human's sense of how his or her body is configured in three-dimensional space, allows a person to accurately interact with their body, including in an eyes-free manner.

It should be understood that the various examples described herein are only examples, and that the technology described herein may be implemented and used in numerous other ways beyond these examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data input in general.

Figure 1:
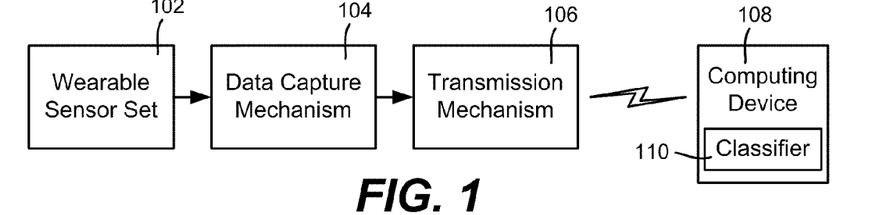
FIG. 1 is a block diagram showing example components for implementing a system that uses the body for detecting data input.

FIG. 1 shows various components that may be used to appropriate part of the human body as an interactive data input device. A wearable sensor set 102 comprising one or more sensors is coupled to a data capture mechanism 104, such as an audio interface that digitally captures data from the sensor set 102. The data capture mechanism provides this information to a transmission mechanism 106, which in turn transmits the location information to a computing device 108; (note that while a wireless communications link is illustrated, it is equivalent to use a wired link to the device). Further note that any electronic device that can receive input data may be considered a computing device, including a cellular telephone, a computer system, a personal digital assistant (PDA) and so forth. The computing device 108 then processes the data to determine location information as to where the body was interacted with (e.g., tapped), and uses this location information as input, e.g., as it does with any interaction with a user interface. To this end, signal processing and a classifier 110 are used, as described below.

Figure 2:
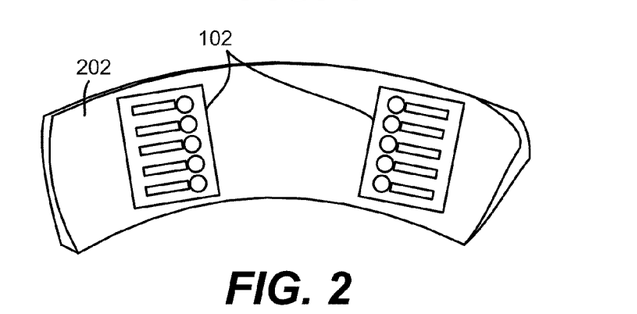
FIG. 2 is a representation of armband configured with a sensor set (sensor arrays) for coupling to the body.
Figure 3:
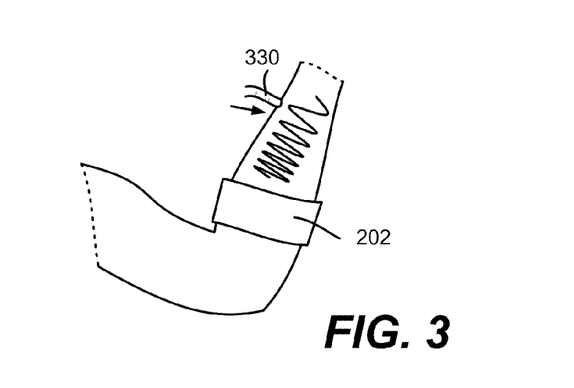
FIG. 3 is a representation of how the sensor set may be worn on an arm to detect interaction by a finger with the arm.
Figure 4:
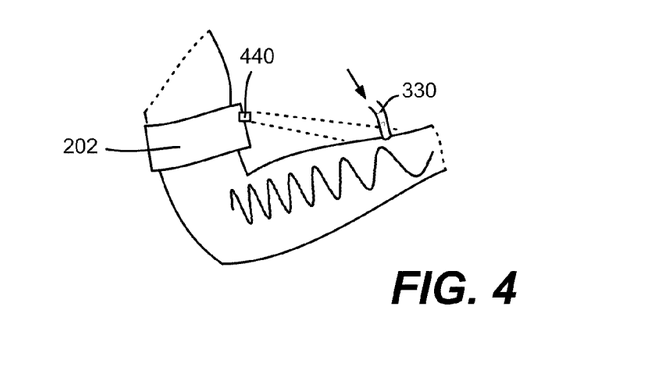
FIG. 4 is another representation of how the sensor set may be worn on an arm to detect interaction by a finger with the arm, including with a location corresponding to a projected image.
Figure 5:
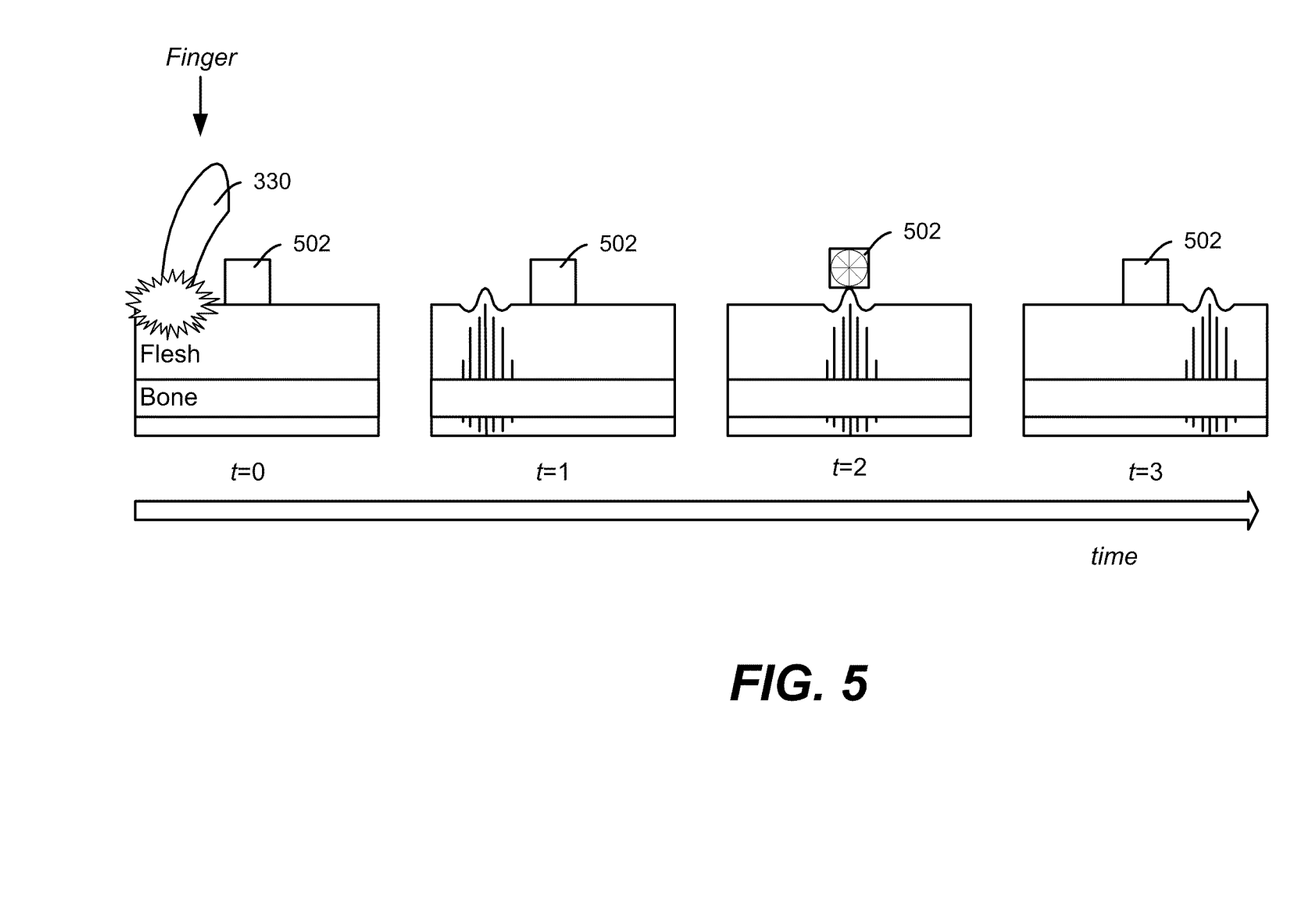
FIG. 5 is a representation of how a sensor of a sensor set detects transverse waves transmitted through the human body.

In one implementation, the technology leverages the natural mechanism (e.g., acoustic) conduction properties of the human body to provide an input system, and includes an input technique that allows the skin to be used as a finger input surface. In one implementation, the sensor set 102 is implemented in a flexible armband 202 attached to the arm as represented in FIGS. 2-4. Notwithstanding, the sensor set may be positioned virtually anywhere, including the head, neck, wrist (e.g., like a wristband or wristwatch), leg, chest, waist (e.g., a belt) and so forth. Note that the arm provides a reasonable surface area for interaction, including a contiguous and flat area for projection, e.g., by a pico-projector 440 (FIG. 4, described below). Further, the forearm and hands contain a complex assemblage of bones that facilitates the acoustic distinctiveness of different locations. Also, a wearable armband is non-invasive and easily removable.

In one implementation, two arrays of five sensing elements each are incorporated into the armband form factor. When a finger 302 or other object taps the skin as generally represented in FIGS. 3-6, mechanical energy is transmitted through the body. This is detected by the sensor set 102 (shown as one particular sensor 502 in FIG. 5 activated at some time t=2 and another particular sensor 602 in FIG. 6 activated at some time t=4). Some energy is radiated into the air as acoustic sound waves, which may be sensed in some implementations, however, this sound energy is not used by the implementation described herein.

To capture the rich variety of mechanical energy/acoustic information described above, various sensing technologies/transducers may be used, including bone conduction microphones, conventional microphones coupled with stethoscopes, piezo contact microphones, and accelerometers. Note however that commercially available transducers were not engineered for measuring mechanical energy/acoustics transmitted through the human body, and as such, generally require some customization or the like to provide acceptable results.

Because lower-frequency signals (e.g., 25 Hz) are useful in characterizing finger taps, one implementation employs a sensor set comprising an array of highly-tuned vibration sensors. Suitable types of sensors include small, commercially available cantilevered piezo films. By adding small weights to the end of the cantilever, the resonant frequency is able to be altered, allowing the sensing element to be responsive to a unique, narrow, low-frequency band of the acoustic spectrum. Adding more mass lowers the range of excitation to which a sensor responds; each element may be weighted such that it aligns with particular frequencies that are useful in characterizing bio-acoustic input.

Figure 6:
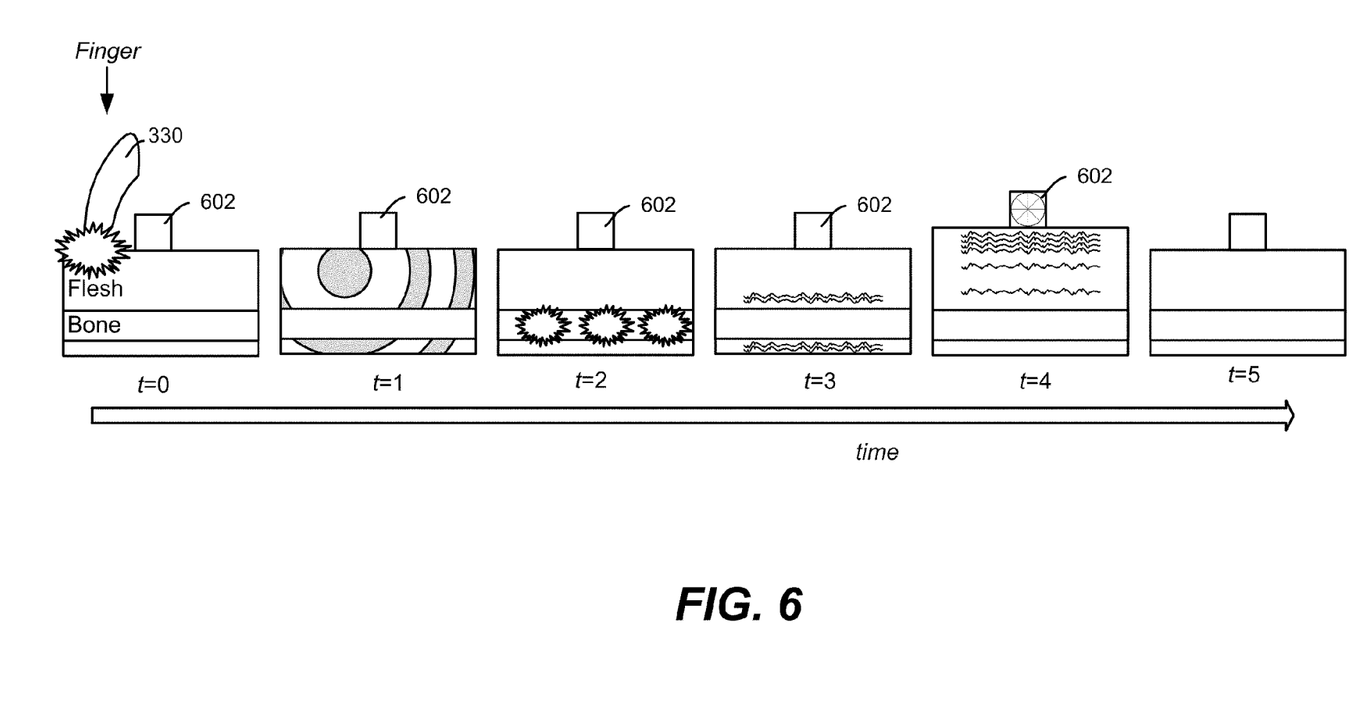
FIG. 6 is a representation of how a sensor of a sensor set detects longitudinal waves transmitted through the human body.

Another benefit of the cantilevered sensors is that they are somewhat naturally insensitive to forces parallel to the skin (e.g., shearing motions caused by stretching). Thus, the skin stretch induced by many routine movements (e.g., reaching for a doorknob) tends to be attenuated. However, the sensors are highly responsive to motion perpendicular to the skin plane, which helps in capturing transverse surface waves (FIG. 5) and longitudinal waves emanating from interior structures (FIG. 6).

A different set of resonant frequencies may be used for each sensor package as in the following table:

| Upper Array | 25 Hz | 27 Hz | 30 Hz | 38 Hz | 78 Hz |
| Lower Array | 25 Hz | 27 Hz | 40 Hz | 44 Hz | 64 Hz |

As can be seen from the above table, the upper sensor array is (mostly) tuned to be more sensitive to lower frequency signals, as these are more prevalent in fleshier areas. Conversely, the lower sensor array is tuned to be sensitive to higher frequencies, in order to better capture signals transmitted though (denser) bones.

Figure 7:
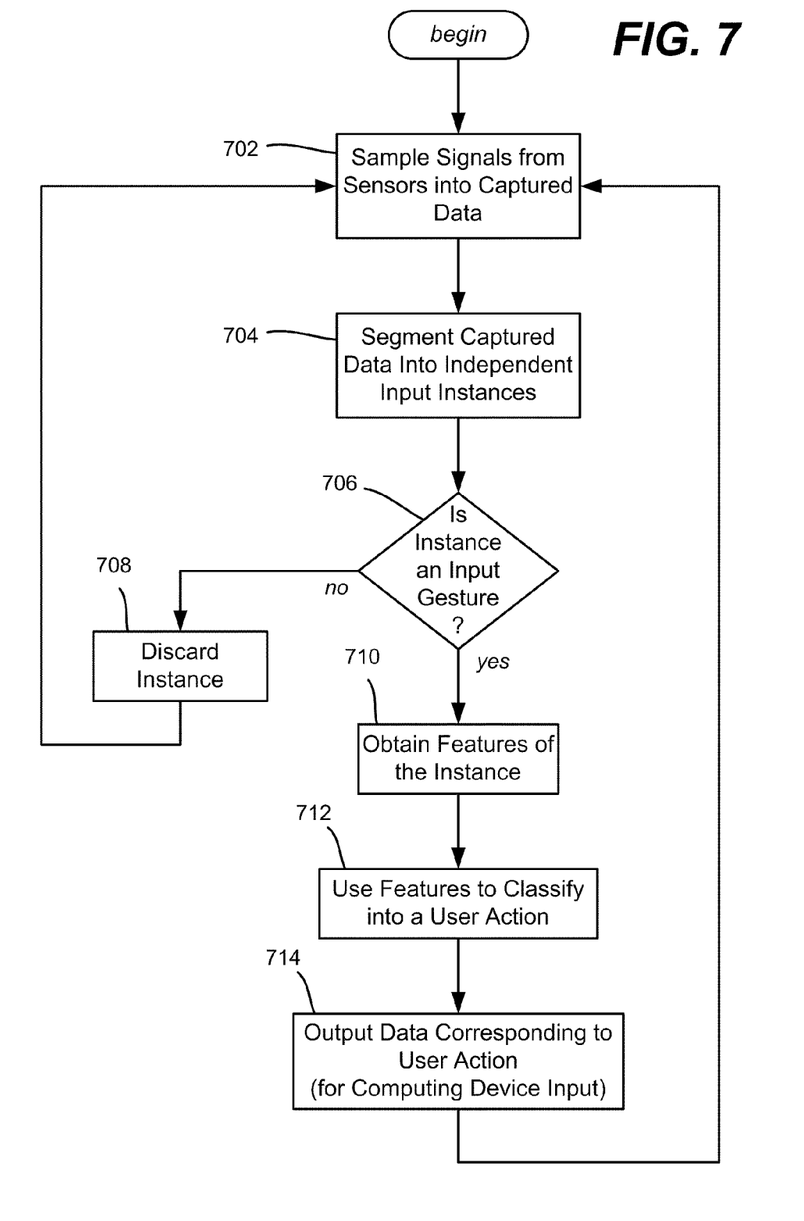
FIG. 7 is a flow diagram showing example steps that may be taken to sense an action performed by the body via a sensor set and determine from signals of the sensor set a particular action that was taken.

In one implementation, generally represented in the flow diagram of FIG. 7 at step 702, each sensor in the array was sampled at 5.5 kHz, a sampling rate that is generally considered too low for speech or environmental audio, but is able to represent the relevant spectrum of frequencies transmitted through the arm. This reduced sample rate (and consequently low processing bandwidth) makes the technique suitable for use with embedded processors.

Figure 8:
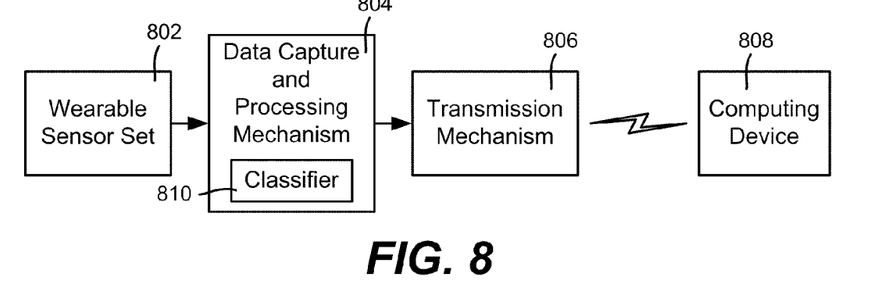
FIG. 8 is a block diagram showing example components for implementing an alternate system that uses the body for detecting data input.

As a result, the alternative implementation shown in FIG. 8 may be employed, so as to have the components mounted on or closely coupled to the same armband or the like that contains the sensor set 802. In this alternative implementation, the location resolution processing is performed by the data capture and processing mechanism 804 before being transmitted to the computing device 808 by a suitable transmission mechanism 806. As described below, signal processing along with a classifier 810 provide output data corresponding to the interaction, whereby in this alternative implementation, the computing device 808 may thus simply receive such data as input, e.g., location and timing data as provided by a conventional pointing device.

Whether running on the remote computer or in an embedded processor, a program may be used to segment the captured data into independent input instances (e.g., corresponding to taps), such as by computing an absolute exponential average of the ten channels. This is represented by step 704 of FIG. 7. Each input instance is then processed, as represented by step 706, to determine if it meets certain criteria indicative of an actual gesture intended by the user. For example, when an intensity threshold is exceeded, the program records the timestamp as a potential start of a tap, that is, a "beginning" threshold. If the intensity did not fall below a second, independent "ending" threshold (e.g., between 100 ms and 700 ms after the onset crossing), the event is discarded (step 708). When start and end crossings are detected that satisfy these criteria, the acoustic data in that period (plus a 60 ms buffer on either end) is considered an input gesture and further processed as described below.

After a segmented signal instance is determined to be a gesture, the instance (e.g., its waveforms) is analyzed to find various features, as generally represented by step 710. Example features include the average amplitude, standard deviation and total (absolute) energy of the waveforms in each channel, (providing thirty features). From these, the average amplitude ratios between channel pairs is computed; (providing forty-five features), along with an average of these ratios (one feature). A 256-point fast Fourier transform (FFT) is computed, from which the lower ten values are used (representing the acoustic power from 0 Hz to 193 Hz), providing another one-hundred features. These are normalized by the highest-amplitude FFT value found on any channel. Also included is the center of mass of the power spectrum within the same 0 Hz to 193 Hz range for each channel, a general estimation of the fundamental frequency of the signal displacing each sensor (providing ten features). Subsequent feature selection established the all-pairs amplitude ratios and certain bands of the FFT to be the most predictive features.

These features (one-hundred eighty six total) are passed to a Support Vector Machine (SVM) classifier previously trained with multiple examples for each input location of interest. As represented by step 712, the classifier then determines the action that the user performed, e.g., what the gesture was, the location of the input gesture, or which finger was used, how it was used, and so forth. The output of that information (for use as user input by the computing device) is represented by step 714. In one implementation, an event model is used, such that once an input is classified, an event associated with that location/gesture is instantiated. Any interactive features bound to that event are fired.

With respect to training, note that different users have different body mass indexes and the like. Also, people have different-length arms and other body parts, which is particularly evident when comparing smaller children to taller adults. Thus, initial training may be performed by each user, or by selecting among user profiles. Alternatively, given enough training data, initial training may be performed for all types of users so that individual users need not perform personalized training or select a profile at all.

Moreover, instead of or in addition to customized training, sensors sets may be tuned differently or otherwise varied for different users (as well as different usages). Thus, for example, there can be a sensor set tuned for a specific weight and height, for a specific body mass, for a male versus female, and so on.

Figure 9:
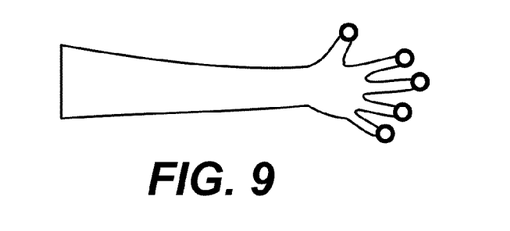
FIGS. 9-11 are representations of input location sets showing various locations on an arm, hand and fingers with which a user may interact.

Turning to various gestures, one set of gestures corresponds to a user tapping on the tips of each of his or her five fingers, as generally represented in FIG. 9. Note that it is also feasible to have the fingers tap something else, such as a surface. In any event, there are measurable acoustic differences among fingers. At the same time, fingers are desirable for data input, as they provide clearly discrete interaction points; note that there are also fourteen knuckles (five major, nine minor), which, along with the fingers, offers nineteen readily identifiable input locations on the fingers alone. Finger-to-finger dexterity is also natural, and the fingers are linearly ordered, which is potentially useful for interfaces like number entry, magnitude control (e.g., volume), and menu selection.

Figure 10:
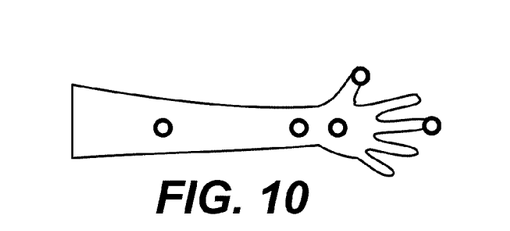
Figure 11:
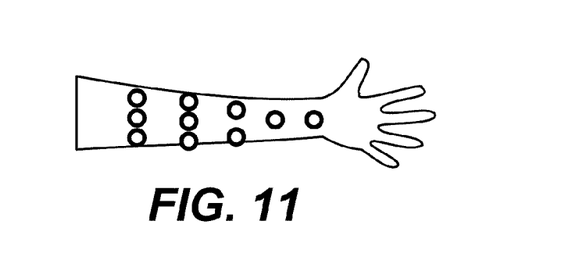
Figure 12:
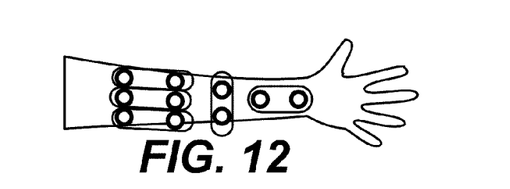
FIGS. 12-17 are representations of grouping of input location sets.
Figure 13:
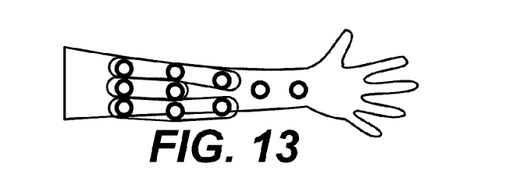
Figure 14:
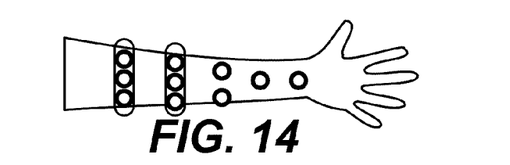
Figure 15:
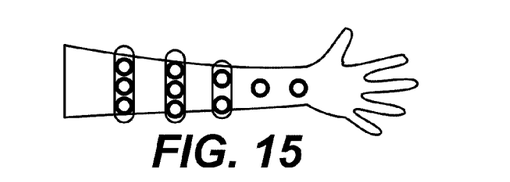
Figure 16:
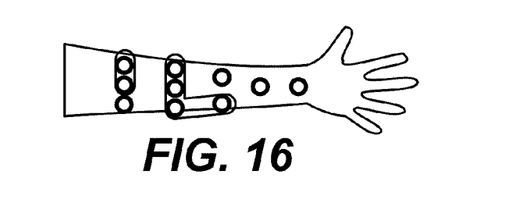
Figure 17:
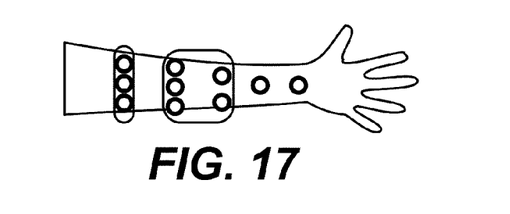

Another gesture set comprises input locations on the forearm and/or hand, as represented in FIGS. 10 and 11, e.g., the arm, wrist, palm, thumb and middle finger. These locations are physically and acoustically distinct, with the large spatial spread of input points offering further variation. The sensor set may be below the elbow as in FIG. 3, or above the elbow as in FIG. 4.

The forearm locations represented in FIG. 11 provides a relatively high density of input locations, and has an input surface (the forearm) that provides a high degree of physical uniformity (unlike the hand for example). The forearm also provides a large and flat surface area, as well as its immediate accessibility, both visually and for finger input. Moreover, the forearm provides a projection surface as in FIG. 4, which is useful for dynamic interfaces. However, using the forearm needs the exemplified sensor set to above the elbow (or possibly on the wrist).

The locations of FIG. 11 may be combined into groups to provide higher accuracy. FIGS. 12-17 show example groupings into target sets based on what logical spatial groupings. Lateral groupings (e.g., FIG. 15) tend to outperform longitudinal groupings (e.g., FIG. 13) in terms of differentiation accuracy.

In addition to bimanual gestures, where the sensor-free arm, and in particular the fingers, are used to provide input, there are other gestures that can be performed with just the fingers of one hand, with reasonable results in terms of differentiation accuracy. For example, a user may tap their index, middle, ring and pinky fingers against their thumb (akin to a pinching gesture); users may also perform flicks instead of taps (i.e., using the thumb as a catch, then rapidly flicking the fingers forward). Such flicks are highly accurate. Flicks may also be combined with taps in a single gesture set. Note that proprioception of a user's fingers on a single hand is quite accurate, providing a mechanism for high-accuracy eyes-free input.

Turning to another aspect, the detection system is able to differentiate among types of materials on which a user is operating. For example, the system differentiates between tapping a finger on the other hand, tapping a paper pad, and tapping an LCD screen. This enables various applications, such as workstations or devices composed of different interactive surfaces, or recognition of different objects grasped in the environment.

Further, users can "tap" surfaces with their fingers in distinct ways. For example, the tip of their finger, the fingernail) or the pad (flat, bottom) of the finger provide bony versus fleshy distinctions. It is also possible to tap with the knuckles (both major and minor metacarpophalangeal joints). This facilitates the ability for interactive touch surfaces to distinguish different types of finger contacts (which are presently indistinguishable in capacitive and vision-based systems, for example). As an example interaction, consider that "double-knocking" on an item opens it, while a "pad-tap" activates an options menu.

Figure 18:
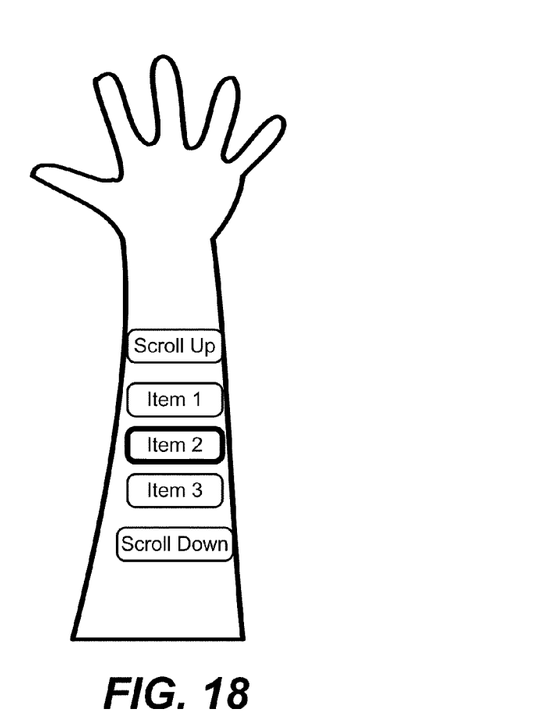
FIGS. 18 and 19 are representations of how a user interface image or set of images may be projected for user interaction therewith.
Figure 19:
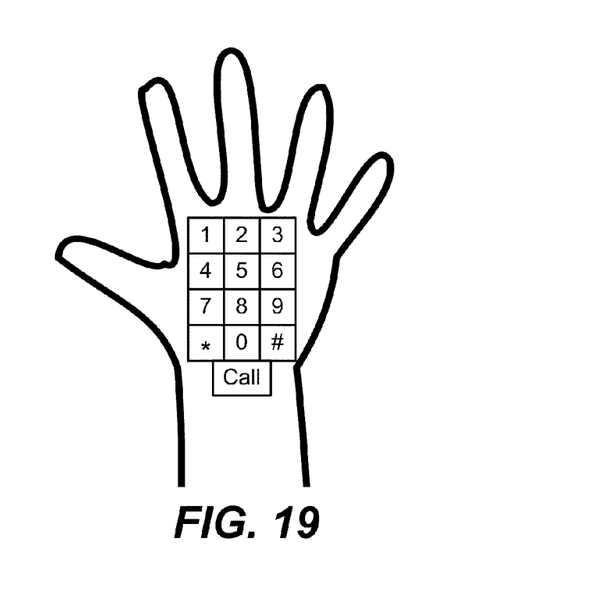

Another aspect is directed towards user interfaces that may be provided for use with the body data input system, as generally represented in FIGS. 18 and 19. In general, a projector (e.g., pico-projector) projects an image of the interface onto a surface, which may be the forearm (FIG. 18) or the hand (FIG. 19), or any other surface such as a table. The projector may be mounted to the body, such as in FIG. 4, however it is also feasible to have the projector be incorporated into a separate device, such as a cellular telephone. In any event, as the user interacts with the projected image, the location of the interaction is detected, which is mapped to the image to provide the appropriate input to the computing device.

While the above description is directed towards one type of body input system, other systems may be used for detecting mechanical energy transmitted through the body. For example, instead of or in addition to frequency sensing, amplitude sensing and/or timing information may be used to detect the location of a tap or other gesture. For example, a tap detected by multiple sensors will each detect the tap at different times, whereby the timing provides information about the location. Stronger and weaker taps may be detected by amplitude variation, such as to help distinguish between a bony (e.g., knuckle) tap or a fleshy (e.g., pad of the finger) tap.

The body input sensing system also may be combined with other input devices to perform other data input operations. For example, a camera can sense a coarse location of a user's hand, for example, while the body input sensing system can determine more finely what the hand is currently doing. One example is in video games, such as a rock climbing game. As another example, consider a video game where the user selects among different virtual objects at different levels by reaching up, straight forward, or down. The camera can sense the arm position and thus the current level, while a detected physical gesture may be used to detect which object is being selected at that level.

As another example, consider a user interacting with a touch-sensitive screen of a device. If the user interacts with one finger, one mode may be active, such as typing characters, whereas if the user interacts with another finger, an editing mode may be provided, (e.g., backspace, delete, cursor movement, enter), without necessarily even changing the underlying display. This mode differentiation is accomplished by differentiating fingers, as described herein.

Combining the body input system with an accelerometer or other sensor (e.g., GPS) may provide further uses, as well as other improvements. For example, if the accelerometer detects substantial motion, then stronger filtering and/or thresholds may be applied so that false positive taps are the like are reduced or eliminated. Sensing the orientation of the hand, for example, may provide for different input meanings, e.g., tapping the forearm with the palm facing up may correspond to one set of input that differs from another set of input made with the same taps but with the palm facing down. Bending the arm versus extending it, clenching versus unclenching the first, and other physical actions tend to result in different frequency characteristics, or may otherwise be sensed, and thus may be used to modulate the meaning of gestures.

Further, because the sensors sense mechanical energy, other vibration frequencies and/or vibration patterns may be sensed. For example, if a cellular telephone puts out a mechanical vibration, then the sensing system is able to detect the pattern and know when the user is holding the cellular telephone, which may then bind with the body input system for communication and interaction. If a user grabs a medicine (pill) bottle and that bottle is configured to vibrate, the user may be warned not to take that particular medication, e.g., as it is not his, or he has already taken it too recently; similarly, a computing device can remind a user to take certain medicine, because the input device has not sensed the vibration yet and the dosage is due.

Thus, the classifier may classify taps on the body or made by the body that are detectable by the sensor set, in which the taps are made by a finger or other object. The classifier may also detect gestures (e.g., flicks) created by at least one part of the body to which the sensor is coupled. The classifier may also differentiate among active energy emitting objects that are sensed as a result of coming into contact with the body, e.g., for a sufficient length of time.

Exemplary Operating Environment

Figure 20:
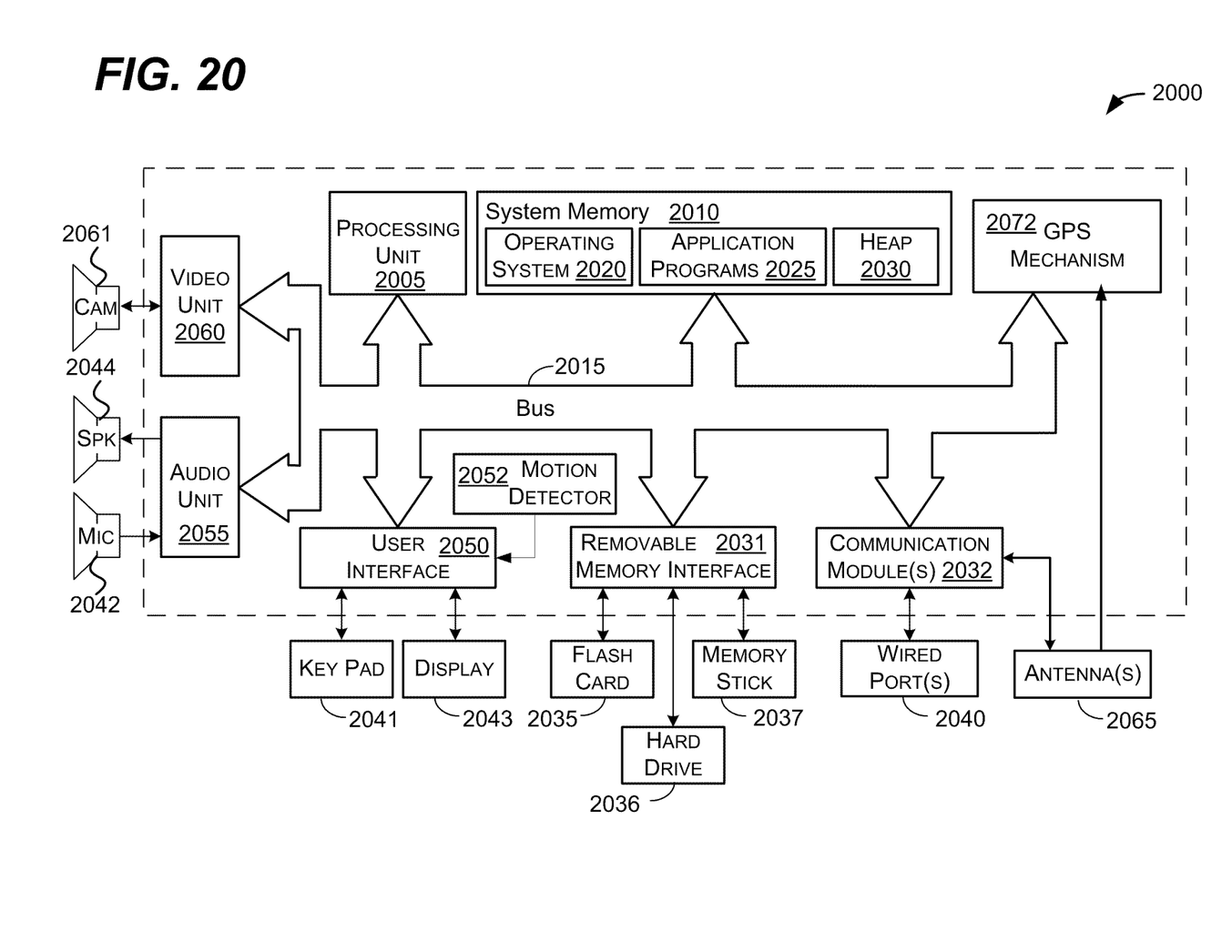
FIG. 20 shows an illustrative example of a mobile computing device/environment into which various aspects of the present invention may be incorporated.

FIG. 20 illustrates an example of a suitable mobile device 2000 on which aspects of the subject matter described herein may be implemented. For example, the mobile device 2000 may serve as the computing device 108 of FIG. 1. The mobile device 2000 is only one example of a device and is not intended to suggest any limitation as to the scope of use or functionality of aspects of the subject matter described herein. Neither should the mobile device 2000 be interpreted as having any dependency or requirement relating to any one or combination of components illustrated in the exemplary mobile device 2000.

With reference to FIG. 20, an exemplary device for implementing aspects of the subject matter described herein includes a mobile device 2000. In some embodiments, the mobile device 2000 comprises a cell phone, a handheld device that allows voice communications with others, some other voice communications device, or the like. In these embodiments, the mobile device 2000 may be equipped with a camera for taking pictures, although this may not be required in other embodiments. In other embodiments, the mobile device 2000 comprises a personal digital assistant (PDA), hand-held gaming device, notebook computer, printer, appliance including a set-top, media center, or other appliance, other mobile devices, or the like. In yet other embodiments, the mobile device 2000 may comprise devices that are generally considered non-mobile such as personal computers, servers, or the like.

Components of the mobile device 2000 may include, but are not limited to, a processing unit 2005, system memory 2010, and a bus 2015 that couples various system components including the system memory 2010 to the processing unit 2005. The bus 2015 may include any of several types of bus structures including a memory bus, memory controller, a peripheral bus, and a local bus using any of a variety of bus architectures, and the like. The bus 2015 allows data to be transmitted between various components of the mobile device 2000.

The mobile device 2000 may include a variety of computer-readable media. Computer-readable media can be any available media that can be accessed by the mobile device 2000 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 2000.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, Bluetooth®, Wireless USB, infrared, WiFi, WiMAX, and other wireless media. Combinations of any of the above should also be included within the scope of computer-readable media.

The system memory 2010 includes computer storage media in the form of volatile and/or nonvolatile memory and may include read only memory (ROM) and random access memory (RAM). On a mobile device such as a cell phone, operating system code 2020 is sometimes included in ROM although, in other embodiments, this is not required. Similarly, application programs 2025 are often placed in RAM although again, in other embodiments, application programs may be placed in ROM or in other computer-readable memory. The heap 2030 provides memory for state associated with the operating system 2020 and the application programs 2025. For example, the operating system 2020 and application programs 2025 may store variables and data structures in the heap 2030 during their operations.

The mobile device 2000 may also include other removable/non-removable, volatile/nonvolatile memory. By way of example, FIG. 20 illustrates a flash card 2035, a hard disk drive 2036, and a memory stick 2037. The hard disk drive 2036 may be miniaturized to fit in a memory slot, for example. The mobile device 2000 may interface with these types of non-volatile removable memory via a removable memory interface 2031, or may be connected via a universal serial bus (USB), IEEE 20394, one or more of the wired port(s) 2040, or antenna(s) 2065. In these embodiments, the removable memory devices 2035-2037 may interface with the mobile device via the communications module(s) 2032. In some embodiments, not all of these types of memory may be included on a single mobile device. In other embodiments, one or more of these and other types of removable memory may be included on a single mobile device.

In some embodiments, the hard disk drive 2036 may be connected in such a way as to be more permanently attached to the mobile device 2000. For example, the hard disk drive 2036 may be connected to an interface such as parallel advanced technology attachment (PATA), serial advanced technology attachment (SATA) or otherwise, which may be connected to the bus 2015. In such embodiments, removing the hard drive may involve removing a cover of the mobile device 2000 and removing screws or other fasteners that connect the hard drive 2036 to support structures within the mobile device 2000.

The removable memory devices 2035-2037 and their associated computer storage media, discussed above and illustrated in FIG. 20, provide storage of computer-readable instructions, program modules, data structures, and other data for the mobile device 2000. For example, the removable memory device or devices 2035-2037 may store images taken by the mobile device 2000, voice recordings, contact information, programs, data for the programs and so forth.

A user may enter commands and information into the mobile device 2000 through input devices such as a key pad 2041 and the microphone 2042. In some embodiments, the display 2043 may be touch-sensitive screen and may allow a user to enter commands and information thereon. The key pad 2041 and display 2043 may be connected to the processing unit 2005 through a user input interface 2050 that is coupled to the bus 2015, but may also be connected by other interface and bus structures, such as the communications module(s) 2032 and wired port(s) 2040. Motion detection 2052 can be used to determine gestures made with the device 2000.

A user may communicate with other users via speaking into the microphone 2042 and via text messages that are entered on the key pad 2041 or a touch sensitive display 2043, for example. The audio unit 2055 may provide electrical signals to drive the speaker 2044 as well as receive and digitize audio signals received from the microphone 2042.

The mobile device 2000 may include a video unit 2060 that provides signals to drive a camera 2061. The video unit 2060 may also receive images obtained by the camera 2061 and provide these images to the processing unit 2005 and/or memory included on the mobile device 2000. The images obtained by the camera 2061 may comprise video, one or more images that do not form a video, or some combination thereof.

The communication module(s) 2032 may provide signals to and receive signals from one or more antenna(s) 2065. One of the antenna(s) 2065 may transmit and receive messages for a cell phone network. Another antenna may transmit and receive Bluetooth® messages. Yet another antenna (or a shared antenna) may transmit and receive network messages via a wireless Ethernet network standard.

Still further, an antenna provides location-based information, e.g., GPS signals to a GPS interface and mechanism 2072. In turn, the GPS mechanism 2072 makes available the corresponding GPS data (e.g., time and coordinates) for processing.

In some embodiments, a single antenna may be used to transmit and/or receive messages for more than one type of network. For example, a single antenna may transmit and receive voice and packet messages.

When operated in a networked environment, the mobile device 2000 may connect to one or more remote devices. The remote devices may include a personal computer, a server, a router, a network PC, a cell phone, a media playback device, a peer device or other common network node, and typically includes many or all of the elements described above relative to the mobile device 2000.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server is often used herein, it will be recognized that this term may also encompass a client, a set of one or more processes distributed on one or more computers, one or more stand-alone storage devices, a set of one or more other devices, a combination of one or more of the above, and the like.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system, comprising:
a sensor set coupled to part of a human body, the sensor set configured to detect mechanical energy transmitted through the body resulting from an action performed by the body and provide output data corresponding to the action; and
a computing device configured to use information corresponding to the output data as data input.

2. The system of claim 1 wherein the sensor set comprises a plurality of sensors, and wherein each sensor is associated with a resonant frequency.

3. The system of claim 1 wherein the sensor set comprises a plurality of tuned vibratory sensors.

4. The system of claim 1 wherein the sensor set is incorporated into an armband coupled to an arm.

5. The system of claim 1 wherein the sensor set is configured to detect mechanical energy corresponding to taps of at least one finger on the body, or on a surface other than the body.

6. The system of claim 1 wherein the sensor set is configured to output signals to a data capture mechanism, and further comprising, a classifier configured to determine from features of the signals the action performed by the body.

7. The system of claim 6 wherein the classifier comprises a support vector machine.

8. The system of claim 6 wherein the classifier is configured to determine at least one of a location of a tap on the body, a magnitude of a tap on the body, a type of a tap on the body, or which finger corresponds to the action performed by the body.

9. The system of claim 6 wherein the classifier is configured to classify or differentiate at least one of taps on the body detectable by the sensor made by a finger or other object, gestures created by at least one part of the body to which the sensor is coupled, or active energy emitting objects that are able to be sensed as a result of coming into contact with the body.

10. The system of claim 1 further comprising at least one other sensor that provides information to the computing device.

11. The system of claim 1 wherein the sensor set outputs signals to a data capture mechanism, and further comprising an embedded processor that processes the signals into the output data.

12. The system of claim 11 further comprising at least one other sensor configured to provide information to the embedded processor.

13. The system of claim 1 further comprising a projector configured to project an image, and wherein the sensor detects mechanical energy resulting from an action performed by the body that interacts with the image.

14. The system of claim 13 wherein the projector is physically coupled to the body, or wherein the projector projects the image onto a surface of the body, or wherein both the projector is physically coupled to the body and the projector projects the image onto a surface of the body.

15. The system of claim 1 wherein the sensor set further detects a vibration of an object that is not part of the body.

16. In a computing environment, a method comprising:
processing, by at least one processor, signals received from a mechanical energy sensor set coupled to a human user into features representative of an action taken by the user;
using the features to classify the action into output data; and
providing the output data for input into a computing device.

17. The method of claim 16 wherein processing the signals comprises:
sampling the signals to obtain captured data; and
segmenting the captured data into independent input instances.

18. The method of claim 17 further comprising:
determining whether an independent input instance corresponds to a gesture.

19. One or more computer-readable media storage devices having computer-executable instructions, which in response to execution by a computer, cause the computer to perform steps comprising:
processing a set of signals received from a mechanical energy sensor set to determine whether the set of signals corresponds to a gesture;
responsive to a determination that the set of signals does not correspond to the gesture, discarding the set of signals;
responsive to a determination that the set of signals does correspond to the gesture extracting features from the set of signals, providing the features to a classifier that determines which gesture was performed from among a set of possible gestures, and providing output data indicating the gesture that was performed.

20. The one or more computer-readable media storage devices of claim 19 having further computer-executable instructions comprising:
obtaining the set of signals by segmenting a plurality of sampled signals.

* * * * *